US007363141B2

(12) United States Patent
Fujii

(10) Patent No.: US 7,363,141 B2
(45) Date of Patent: Apr. 22, 2008

(54) APPARATUS AND METHOD FOR MANUFACTURING FUEL INJECTION CONTROL SYSTEMS

(75) Inventor: Hiroto Fujii, Kariya (JP)

(73) Assignee: Denso Corporation, Kariya, Aichi-pref. (JP)

(*) Notice: Subject to any disclaimer, the term of this patent is extended or adjusted under 35 U.S.C. 154(b) by 30 days.

(21) Appl. No.: 11/518,492

(22) Filed: Sep. 11, 2006

(65) Prior Publication Data

US 2007/0056564 A1 Mar. 15, 2007

(30) Foreign Application Priority Data

Sep. 9, 2005 (JP) ............................. 2005-261614
May 30, 2006 (JP) ............................. 2006-149974

(51) Int. Cl.
*F02D 41/38* (2006.01)
*F02M 51/00* (2006.01)
*G06F 19/00* (2006.01)

(52) U.S. Cl. ..................... 701/104; 123/480; 73/119 A

(58) Field of Classification Search ................ 701/104, 701/105, 115, 102, 101; 123/480, 486; 73/119 A
See application file for complete search history.

(56) References Cited

U.S. PATENT DOCUMENTS 5,003,950 A 4/1991 Kato et al.
5,806,497 A 9/1998 Hosoya
6,961,650 B2 * 11/2005 Itoh ........................... 701/104

FOREIGN PATENT DOCUMENTS

EP 1 026 384 B1 8/2004
JP 2000-220508 8/2000
WO WO 2006/122427 A1 * 11/2006

OTHER PUBLICATIONS

Hungarian Search Report/Opinion mailed Feb. 16, 2007 in Application No. P0600716 together with an English translation.

* cited by examiner

*Primary Examiner*—Hieu T. Vo
(74) *Attorney, Agent, or Firm*—Nixon & Vanderhye P.C.

(57) ABSTRACT

A method is provided to manufacture a fuel injection control system controlling fuel injection in an internal combustion engine with a fuel injection valve. A fuel injection valve is trial-manufactured. Using this valve, correcting amounts for an injection period are calculated at plural adjustment points defined by fuel pressures and injection periods. The adjustment points are divided into actual-measuring points and predicting points, and the correcting amounts at the actual-measuring points are used to calculate predicting expressions to predict correcting amounts at the predicting points and relational expressions to define a relationship among the correcting amounts at the actual-measuring points. When the valve is mass-manufactured, for each mass-manufactured valve, the correcting amounts at the actual-measuring points and the predicting expressions are used to predict correcting amounts at the predicting points, providing the correcting amounts at the actual-measuring and correcting points. Appropriateness of the predicting expressions is also estimated.

13 Claims, 8 Drawing Sheets

FIG. 6A

| $R^2$ | b1 | b2 | b3 | b4 | b5 | b6 |
|---|---|---|---|---|---|---|
| a1 | 0.95 | 0.77 | 0.81 | 0.77 | 0.81 | 0.71 |
| a2 | 0.88 | 0.87 | 0.78 | 0.75 | 0.86 | 0.85 |
| a3 | 0.87 | 0.91 | 0.92 | 0.88 | 0.89 | 0.72 |
| a4 | 0.62 | 0.67 | 0.64 | 0.61 | 0.66 | 0.87 |
| a5 | 0.77 | 0.77 | 0.77 | 0.85 | 0.74 | 0.80 |
| a6 | 0.78 | 0.79 | 0.72 | 0.71 | 0.71 | 0.83 |

FIG. 6B

| | b1 | b2 | b3 | b4 | b5 | b6 |
|---|---|---|---|---|---|---|
| 1 | a1 | a3 | a3 | a3 | a3 | a4 |
| 2 | a2 | a2 | a1 | a5 | a2 | a2 |
| 3 | a3 | a6 | a2 | a1 | a1 | a6 |
| 4 | a6 | a1 | a5 | a2 | a5 | a5 |
| 5 | a5 | a5 | a6 | a6 | a6 | a3 |
| 6 | a4 | a4 | a4 | a4 | a4 | a1 |

ROUNDED DOWN $$dTQb1 = \alpha \times dTQa1 + \beta \times dTQa2 + \gamma \times dTQa3 + \delta$$

⋮

APPARATUS AND METHOD FOR MANUFACTURING FUEL INJECTION CONTROL SYSTEMS

CROSS REFERENCE TO RELATED APPLICATIONS

The present application relates to and incorporates by reference Japanese Patent applications No. 2005-261614 filed on Sep. 9, 2005 and No. 2006-149974 filed on May 30, 2006.

BACKGROUND OF THE INVENTION

1. Technical Field of the Invention

The present invention relates to a method for producing fuel injection control systems which control injection of fuel in internal combustion engines.

2. Related Art

A fuel injection control systems is known which is provided with a common rail serving as a common accumulator for supplying high-pressure fuel into fuel injection valves of respective cylinders of a diesel engine. In this common-rail type of fuel injection control for diesel engines, injection periods (during each of which the injection lasts), which are necessary for operating fuel injection valves, are set depending on an amount of fuel to be demanded and fuel pressure in the common rail.

There is variability (irregularity) in injection characteristics, which are due to the individual specificities of respective fuel injection valves. For producing the fuel injection valves, it is general that the variability is allowed. Thus, even when the injection periods are adjusted to depend on the fuel pressure so that the fuel is injected under the foregoing demanded fuel amounts, the amounts of the fuel to be injected for actual use varies due to the variability in the above injection characteristics.

One countermeasure to improve this situation has been proposed in Japanese Patent Laid-open Publication No. 2000-220508, which teaches the manufacturing process for fuel injection valves. In this manufacturing process, each fuel injection valve is subjected to measurement of its fuel injection characteristics, and based on the resultant characteristics, a correcting amount to correct a difference between a demanded fuel amount and the actual injection amount is computed for the correction. Further, a fuel injection valve which corresponds to the correcting amount is amounted in a diesel engine with a fuel injection control system, data indicative of the computed correcting amount is made to be stored in a fuel injection control apparatus which plays a control part in the system.

However, when the foregoing technique involving the correcting amount is used, the fuel characteristics of each fuel injection valve should be measured for every operation range to which a demanded correcting amount belongs. This causes an adjustment process for the fuel injection control to be complicated considerably, whereby this is not negligible.

In addition, the above drawback is not limited to the fuel injection control system for the diesel engine. That is, even in the case of a fuel injection control system controlling the injection of fuel in the internal combustion engine, the adjustment process for the fuel injection control is made complicated in greater or lesser degrees. Hence this negligible drawback is also true of the fuel injection control system for the internal combustion engine.

SUMMARY OF THE INVENTION

The present invention has been made in consideration of the foregoing difficulties, and it is an object of the present invention to provide a method for readily manufacturing a fuel injection control system with high control precision.

In order to achieve the above object, the present invention provided as one aspect a method for manufacturing a fuel injection control system controlling an injection of fuel in an internal combustion engine with a fuel injection valve, the method comprising steps of: preparing for manufacturing including: a first step wherein a plurality of measurement points are set in a map based on at least one of a pressure of the fuel supplied to the fuel injection valve and an injection period of the fuel in the fuel injection valve, the map being defined by an injection amount and the injection period in which the pressure is taken as a parameter, and one or more preparing fuel injection valves are subjected to measurement of variability in injection characteristics thereof at every adjustment point; a second step wherein the plurality of adjustment points are classified into two groups consisting of one group composed by actual-measuring points and the other group composed by predicting points and, using the measured variability in the injection characteristics, a predicting expression predicting variability in the injection characteristics at the predicting points from variability in the injection characteristics at the actual-measuring points is produced and memorized; a third step wherein, by using the measured variability in the injection characteristics, a first relationship among the variability in the injection characteristics at the actual-measuring points is defined and memorized; measuring variability in injection characteristics of each of manufactured fuel injection valves at the actual-measuring points; and adjusting a manipulated variable to each of the manufactured fuel injection valves by using measurements of the variability measured in the measured step, a second relationship among the measurements of the variability measured in the measured step, the first relationship among the variability in the injection characteristics memorized in the third step, and the predicting expression memorized in the second step.

As another aspect, the present invention provides a calculation apparatus for manufacturing a fuel injection control system controlling an injection of fuel in an internal combustion engine with a fuel injection valve, comprising: preparing means performing: a first step wherein a plurality of measurement points are set in a map based on at least one of a pressure of the fuel supplied to the fuel injection valve and an injection period of the fuel in the fuel injection valve, the map being defined by an injection amount and the injection period in which the pressure is taken as a parameter, and one or more preparing fuel injection valves are subjected to measurement of variability in injection characteristics thereof at every adjustment point; a second step wherein the plurality of adjustment points are classified into two groups consisting of one group composed by actual-measuring points and the other group composed by predicting points and, using the measured variability in the injection characteristics, a predicting expression predicting variability in the injection characteristics at the predicting points from variability in the injection characteristics at the actual-measuring points is produced and memorized; a third step wherein, by using the measured variability in the injection characteristics, a first relationship among the variability in the injection characteristics at the actual-measuring points is defined and memorized; measuring means for measuring variability in injection characteristics of each of manufactured fuel injection valves at the actual-measuring points; and adjusting means for adjusting a manipulated variable to each of the manufactured fuel injection valves by using measurements of the variability measured in the measured step, a second relationship among the measurements of the variability measured in the measured step, the first relationship among the variability in the injection characteristics memorized in the third step, and the predicting expression memorized in the second step.

BRIEF DESCRIPTION OF THE DRAWINGS

In the accompanying drawings:

FIGS. 6A and 6B are tables showing part of the process to produce the predicting expression that predicts the correcting amounts at predicting points in the map on the basis of the correcting amounts obtained at actual-measuring points in the map;

DETAILED DESCRIPTION OF THE PREFERRED EMBODIMENTS

Hereinafter, with reference to the accompanying drawings, an embodiment of a method for manufacturing a fuel injection control system, which is according to the present invention, will now be described as to the method for manufacturing a fuel injection control system for diesel engines.

Figure 1:
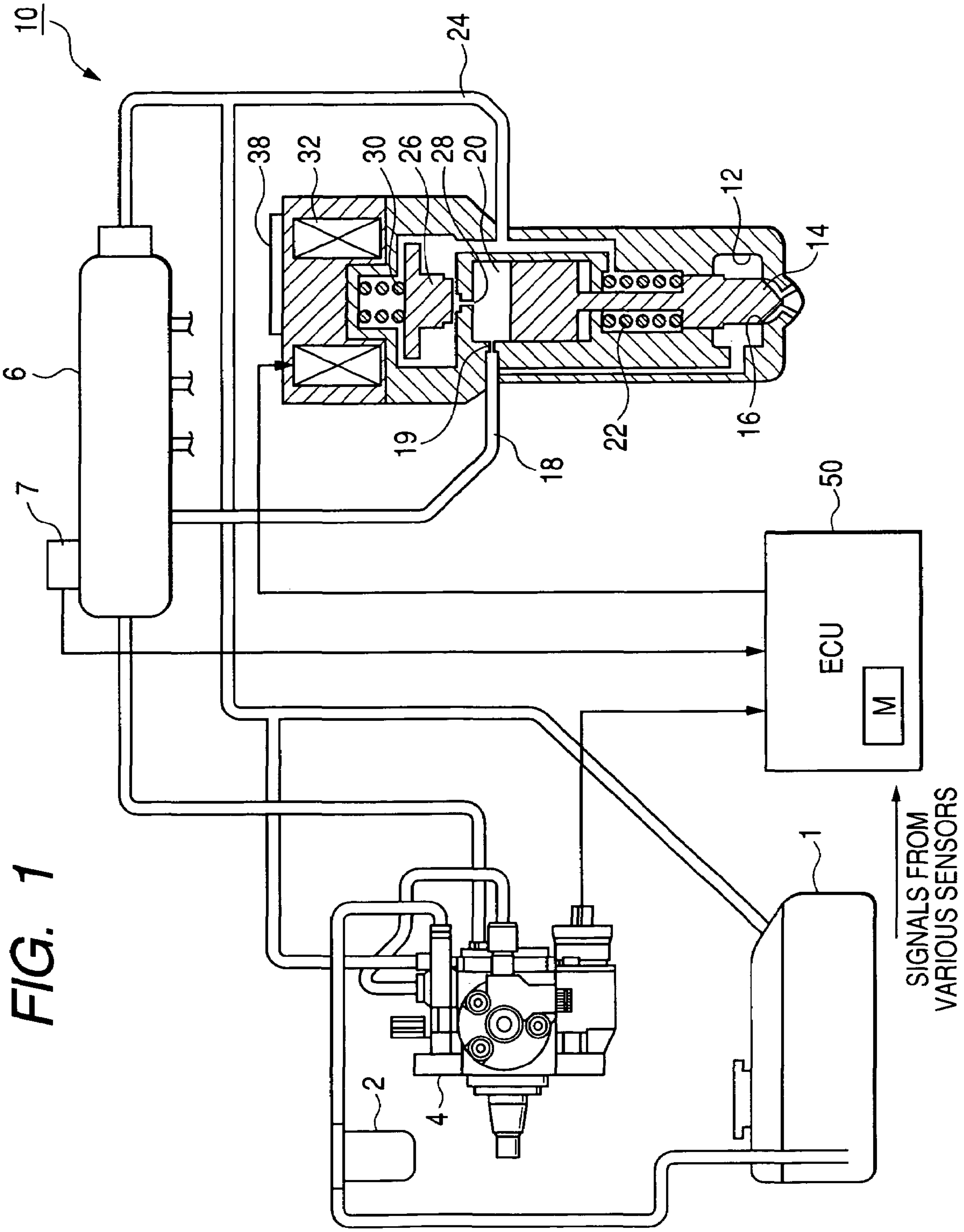
FIG. 1 is a schematic diagram outlining the overall configuration of a fuel injection control system according to an embodiment of the present invention.

FIG. 1 shows the overall configuration of a fuel injection control system according to the present embodiment. As shown, the system is provided with a fuel tank 1 accommodating fuel, which is pumped up by a fuel pump 4 via a filter 2. Through the pumping-up process by the fuel pump 4, the fuel, is pressurized and supplied to a common rail 6. This common rail 6 is a piping system formed to preserve therein the fuel which is pressurized and supplied from the fuel pump 4 (high-pressure fuel) and to distribute and supply the fuel-pressure fuel to a fuel injection valve 10 for each cylinder (in FIG. 1, only the fuel injection valve for one cylinder is depicted). The common rail 6 is provided with a fuel pressure sensor 7 for sensing a signal representing the pressure of the preserved fuel, so that the signal can be used for measurement of the fuel pressure.

The fuel injection valve 10 receives the high-pressure fuel supplied from the common rail 6 and supplies it to the combustion chamber (not shown) of a diesel engine in an injected manner. This injection supply will now be detailed more. The fuel injection valve 10 has a distal portion at which there is formed a cylindrical needle containing chamber 12, in which a nozzle needle 14 is accommodated so as to be displaced along a longitudinal direction in the chamber 12. When the nozzle needle 14 is made to be seated on an annular needle seat 16, which is formed at the distal portion of the fuel injection valve 10, whereby the needle containing chamber 12 is cut off from the outside (that is, the combustion chamber of the engine). In contrast, in response to a release action of the nozzle needle 14 from the needle seat 16, the needle containing chamber 12 is allowed to communicate with the outside. Into the needle containing chamber 12, the high-pressure fuel is supplied from the common rail 6 via a high-pressure fuel passage 18.

The nozzle needle 14 has an elongated body of which back-side portion (i.e., the distal portion that is opposite to an end portion facing the needle seat 16) extends in a back pressure chamber 20. Into the back pressure chamber 20, the high-pressure fuel is supplied from the common rail 8 via a high-pressure fuel passage 18 and an orifice 19. As described, the nozzle needle 14 is shaped into an elongated form having an intermediate recess portion, to which a needle spring 22 is secured. The needle spring 22 causes the nozzle needle 14 to be pushed toward the distal portion of the fuel injection valve 10.

Further, as shown in FIG. 1, the common rail 6 is connected to the fuel injection valve 10 through a low-pressure fuel passage 24 which also communicate with the fuel tank 1. The communication between the low-pressure fuel passage 24 and the back pressure chamber 20 is established or blocked selectively by a valve element 26. Concretely, an orifice 28 is formed in a wall portion which partitions the back pressure chamber 20 from a second chamber to which the flow-pressure passage 24 is connected. The second chamber is provided a valve element 26. Hence by making the valve element 26 close the orifice 28, the back pressure chamber 20 is shut off from the low-pressure fuel passage 24, whilst by making the valve element 26 open the orifice 28, the back pressure chamber 20 is able to communicate with the low-pressure fuel passage 24.

The valve element 26 is always pushed by a valve spring 30 toward the orifice 28, that is, toward the distal end of the fuel injection valve 10. An electromagnetic force generated by an electromagnetic solenoid 32 allows the valve element 26 to be pulled, so that the valve element 26 is displaced backward in the valve 10.

On the fuel injection valve 10, a plate 38 is fixedly disposed. A QR code (registered trade mark; two-dimensional code) indicative of information about individual differences of the valve 10 is embedded in the plate 38. This will now be explained in detail later.

In the foregoing configurations, when the electromagnetic solenoid 32 is not powered, i.e., the pulling force is not effected, the valve element 26 is pushed by the valve spring 30 so as to close the orifice 28. In this state, the nozzle needle 14 is pushed by the needle spring 22 toward the distal portion of the fuel injection valve 10, whereby the tip of the nozzle needle 14 is seated on the needle seat 16, realizing the closed state of the valve 10.

In contrast, in response to powering the electromagnetic solenoid 32, the pulling force generated from the electromagnetic solenoid 32 allows the valve element 26 to displace backward in the fuel injection valve 10, thus opening the orifice 28. Thus, the high-pressure fuel in the back pressure chamber 20 is flowed into the flow-pressure fuel passage 24 via the orifice 28, resulting in that a force applied to the nozzle needle 14 by the high-pressure fuel in the back pressure chamber 20 becomes smaller than a force applied to the nozzle needle 14 by the high-pressure fuel in the needle containing chamber 12. In a case where this difference between both forces is greater than the pushing force of the needle spring 22 to the nozzle needle 14 toward the distal portion of the fuel injection valve 10, the nozzle needle 14 is separated from the needle seat 16, thus realizing the open state of the valve 10.

Furthermore, the fuel injection control apparatus of the present embodiment comprises an electronic control unit (ECU) 50 with a central processing unit (CPU), memories, and other elements necessary for computation. The ECU 50 receives signals sensed by various sensors for measuring operated states of the diesel engine and environmental states under which the diesel engine is operates, and based on the sensed signals, the output characteristics of the diesel engine. For example, depending on the operated states of the diesel engine, the fuel injection thereof is controlled to sustain the output performance and exhaust characteristics of the diesel engine in an optimum manner. One mode for such control is as follows.

By using pieces of information obtained from the signals indicating the operated states of the diesel engine and the environment under which the diesel engine operates, the ECU 50 specifies a fuel pressure to be targeted (i.e., target fuel pressure) in the common rail 6. The ECU 50 uses this target fuel pressure to operate the fuel pump 4, whereby an actual fuel pressure in the common rail 6 is controlled at the target fuel pressure. In addition, the ECU 50 receives pieces of information presenting user's demands, operated states of the diesel engine, and the environment under which the diesel engine operates, and uses those pieces of information to calculate amounts of fuel to be demanded for the injection and timing at which the injection should start. Further, the ECU 50 estimates an injection period on the basis of the calculated amounts of fuel to be demanded and an actual fuel pressure measured via the fuel pressure sensor 7, and uses information about the estimated injection period and the injection-start command timing so that the fuel injection valve 10 is subjected to current-supply operations for the control.

By the way, even when the injection timing and the injection-start command timing are specified as above on the operated states of the diesel engine and the environment under which the diesel engine operates, the fuel injection valve 10 has an individual difference which may have a large influence. That is, the injection characteristics of the fuel injection valve 10 may fluctuate. Hence in such a case, it is not always true that the above control realizes an optimum and high-quality output performance and exhaust characteristics.

The present embodiment provides a solution to this difficulty. Specifically, based on the measurements of the injection characteristics of each fuel injection valve 10, a correcting amount correcting an amount to be operated (simply referred to as an operation amount) of a manipulated variable is obtained. The correcting amount is to compensate a difference between a fuel injection characteristic obtained in operating the fuel injection valve 10 at a reference operation amount and a fuel injection characteristic desired on the reference operation amount. The correcting amount will now be detailed as below.

Figure 2:
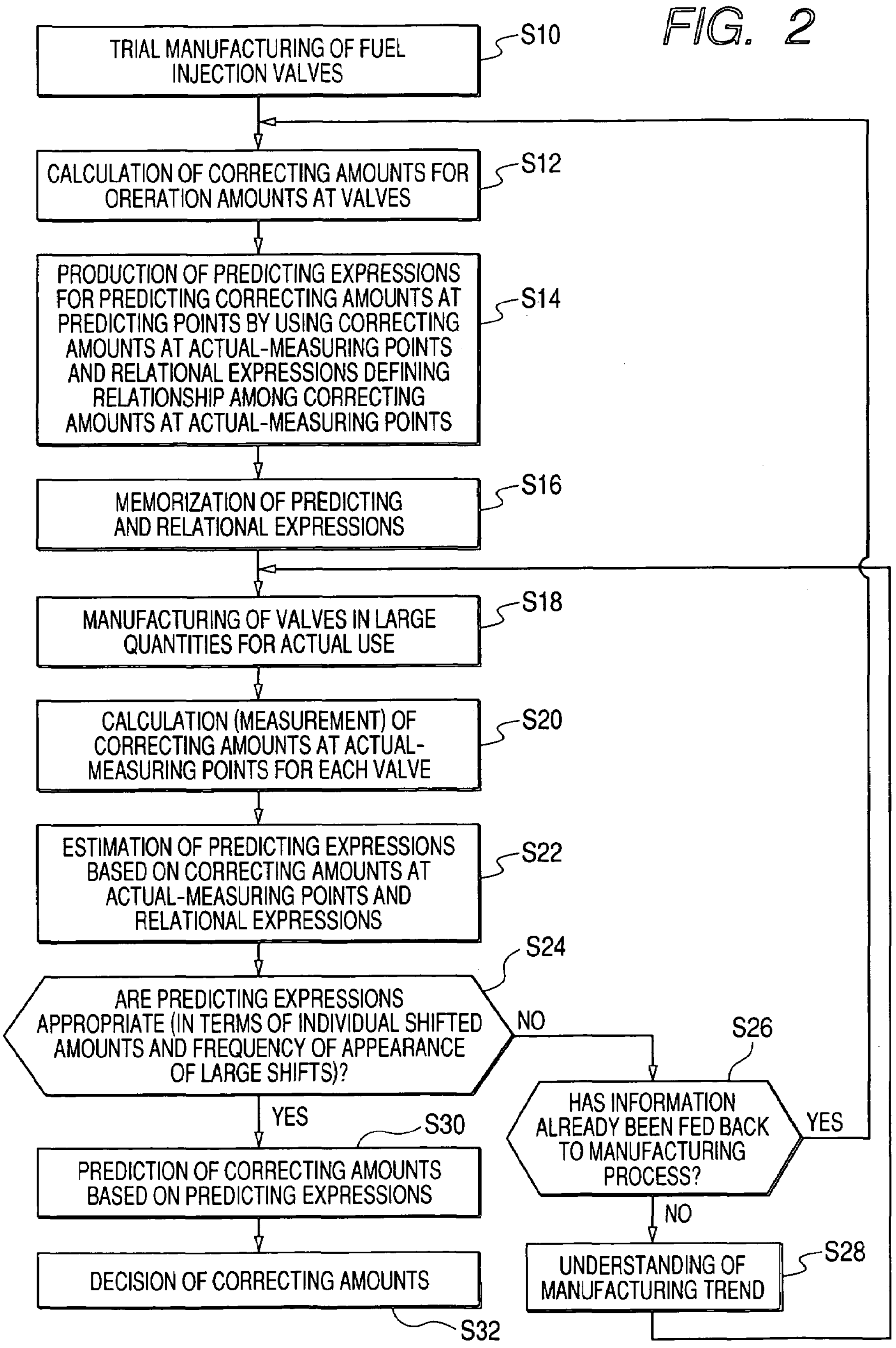
FIG. 2 is a flowchart showing a manufacturing process of the fuel injection control system in the embodiment.

With reference to FIG. 2, the fuel injection control system according to the present embodiment will now be described as to its manufacturing process. The programs for the manufacturing process may be stored in part or as a whole in the memory device M of the ECU 50 or in a storage of another computer system placed in the manufacturing premise.

The manufacturing process consists of a series of steps, wherein at step S10, factory workers or robots are ordered by the ECU 50 or another computer system to make properly-decided plural fuel injection valves 10 as trial production. This trail production is conducted such that the trial-produced fuel injection valves 10 have deliberate variability in their fuel injection performances. The deliberate variability is set to a value allowable in actually mass-producing the fuel injection valves 10.

Figure 3:
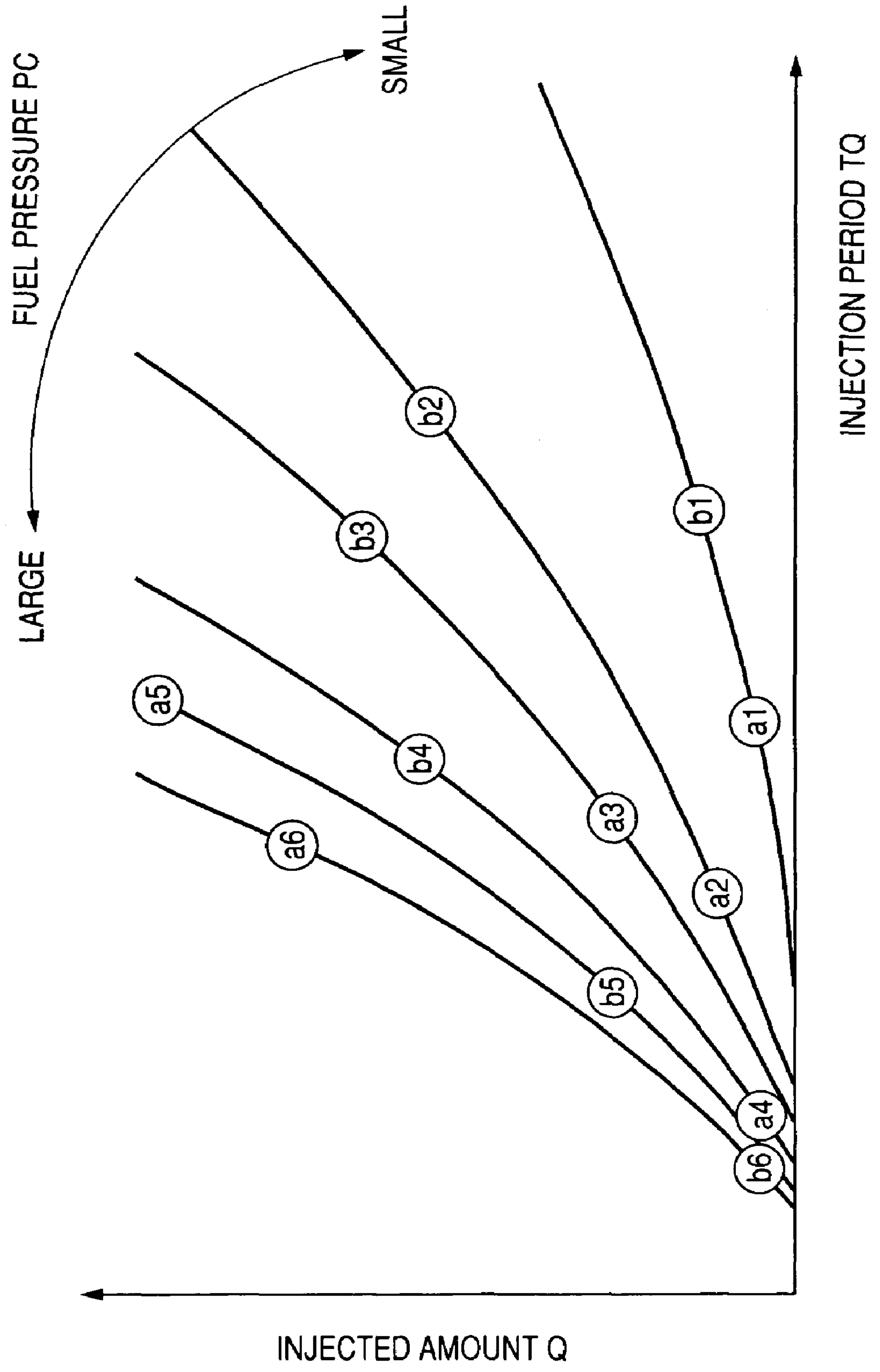
FIG. 3 is a graph illustrating adjustment points in a map for correcting amounts on which an operation amount of a fuel injection valve is corrected.

Then at step S12, as to each of trial-manufactured fuel injection valves 10, correcting amounts at respective adjustment points in FIG. 3 are calculated (measured). As shown in FIG. 3, the adjustment points, which are composed of actual-measuring points a1 to a6 and predicting points b1 to b6, can be defined by both an injection period TQ during which the fuel injection lasts and a fuel pressure Pc in the common rail 6.

The graph in FIG. 3, which is stored in the form a map in a memory device M of the ECU 50, permits the ECU 50 to use the map for map-computing an injection period TQ necessary for obtaining an injection amount Q to be demanded of the fuel in a state where a fuel pressure Pc is given. That is, using the map pictorially shown in FIG. 3, a reference amount of the injection period TQ is fixed for operating each fuel injection valve 10. Further, the respective adjustment points in FIG. 3 are used to compensate the injection period TQ to be referenced in compliance with correcting amounts for compensating variability of the injection characteristics, which is due to the individual differences. As an alternative manner, the map is made when the fuel injection characteristics are measured at step S12.

For example, those correcting amounts are calculated such that the fuel injection amount is first measured at each adjustment point, and calculated (measured) as an amount to compensate a shift (difference) of the measured amount from the injection amount Q.

The above adjustment points are positioned at points which are especially significant for giving a high performance to the diesel engine and make it possible that correcting amounts at points other than the adjustment points are calculated with high precision through the correction. Moreover, of those adjustment points, the actual-measuring points a1 to a6 are set-to have priority higher than the predicting points b1 to b6.

Figure 4A:
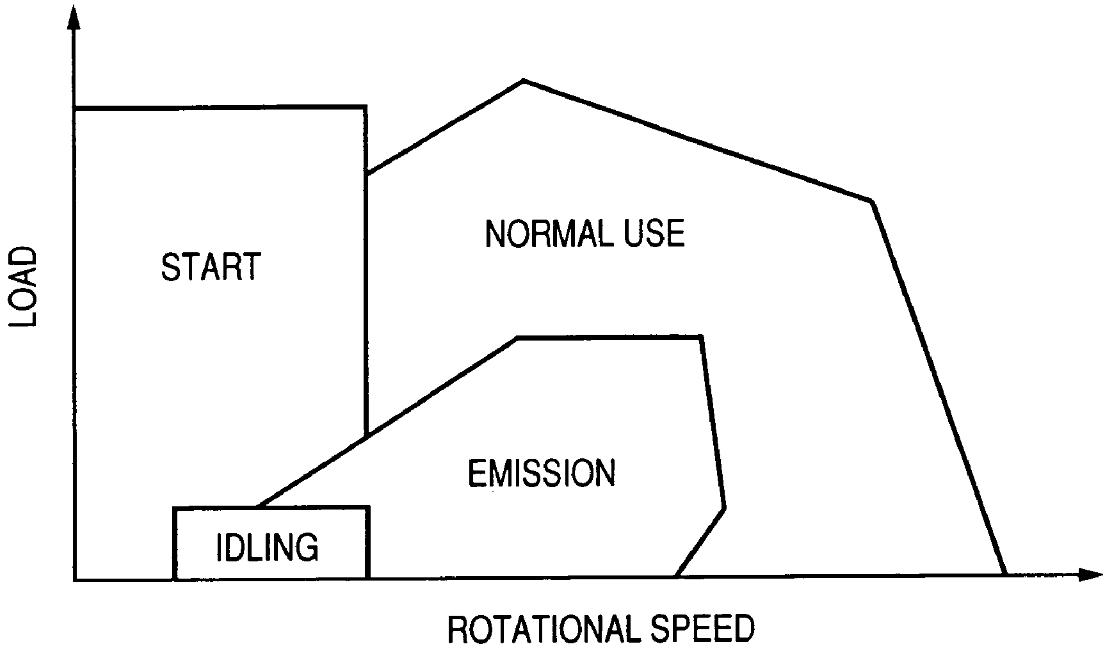
FIGS. 4A and 4B are graphs illustrating why the adjustment points are set as shown in FIG. 3.

FIG. 4A exemplifies a map showing operational regions defined by the rotation speed of the diesel engine used in the present embodiment and load amounts, the operational regions consisting of an idling region, starting region, emission region, and normally used region. As shown, the idling region resides to have lower load amounts and lower rotational speeds in the map. The starting region, which resides to have load amounts higher than the idling region, is a region injecting the fuel, during which the diesel engine is cranked by a starter motor and raised to an idling rotational speed. The emission region is located in the map so that this region largely influences the exhaust characteristics in a predetermined running pattern such as 10-15 running mode. The normally used region is set as a predetermined region surrounding the emission region.

Figure 4B:
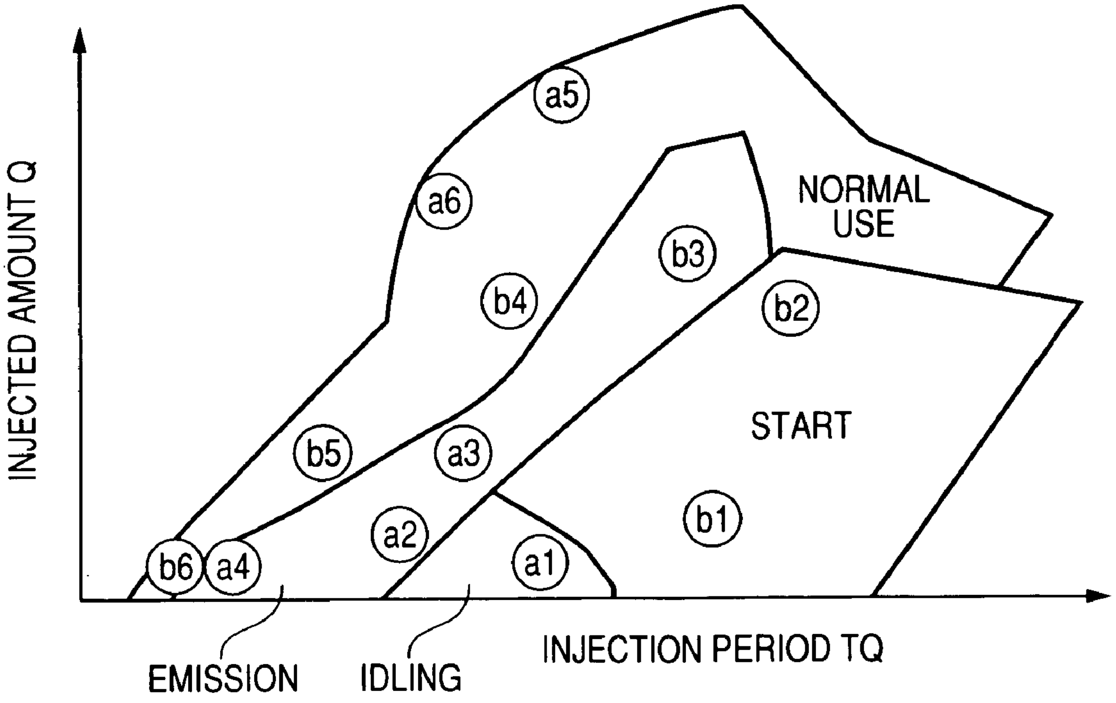

FIG. 4B shows a map composed of four regions which are produced by converting the above four regions which based on an injection period of fuel, fuel amounts to be injected (injection amounts), and fuel pressure. In the present embodiment, as shown, the emission range is decided to occupy three actual-measuring points a2 to a4 which are half of the entire actual-measuring points a1 to a6. The reason is that these three actual-measuring points are especially significant for securing a high exhaust characteristic on the predetermined running pattern. These three actual-measuring points a2 to a4 are designated as points which appear at high frequencies in analyzing the frequency of appearance for controlling fuel injection on the predetermined running pattern and which serve as key points to holding high precision in calculating, based on the correction, the correcting amounts at points other than the adjustment points.

The actual-measuring point a1 is located in the idling region. This is because controlling the idling rotational speed significantly decides the performance of the diesel engine. Thus this actual-measuring point a1 is located at a point that appears at a highest frequency in controlling the idling rotational speed. The remaining actual-measuring points a5 and a6 are placed near the boundary of the normally used region, that is, in a full-load operating region. This is because the full-load operating region is also significant in deciding the performance of the diesel engine.

Meanwhile the predicting points b1 to b6 are also important for deciding the performance of the diesel engine, though those points b1 to b6 are lower in the priority with regard to comparison with the actual-measuring points a1 to a6. Hence the predicting points b1 to b6 are located at points that allow correction at the other adjustment points to be calculated with precision by the correction based on the actual-measuring points a1 to a6 and the predicting points b1 to b6.

Then, at step S14 in FIG. 2, the correcting amounts at the actual-measuring points a1 to a6 in FIG. 3 are used to calculate a predicting expression that predicts correcting amounts at the predicting points b1 to b6 as well as a relational expression that defines a relationship among the actual-measuring points.

Now the natures of the two types of points will be given. The actual-measuring points a1 to a6 are adjustment points for measuring fuel injection characteristics during calculation of correcting amounts when the fuel injection valve 10 is manufactured in large quantities. The predicting points b1 to b6 are adjustment points for predicting fuel injection characteristics on the predicting expression during calculation of correcting amounts when the fuel injection valve 10 is manufactured in large quantities. Namely, for manufacturing the valve 10 in large quantities, the measurement of the injection characteristics is limited only to the actual-measuring points a1 to a6, but the predicting expression is used so that correcting amounts at both the actual-measuring points a1 to a6 and the predicting points b1 to b6 are acquired.

The relational expression, which defines the relationship among the actual-measuring points a1 to a6, is for estimation of the reliability of the predicting expression. When the fuel injection valve 10 undergoes mass-production, a manufacturing trend (i.e., a trend inherent to manufacturing as to how structural errors occur in the valve 10) may depend on changes in manufacturing environment, manufacturing facilities, human resources for manufacturing. If such errors occur in fact, a trend of variability in fuel injection characteristics may change, which may result in a lowered reliability of the predicting expression. The fuel characteristics are measured at only the actual-measuring points a1 to a6, and the resultant measurements are used together with the predicting expression. However, these steps are not enough in that the reliability of the predicting expression cannot be estimated. In the present embodiment, in addition to those steps, the relational expression is produced to define the relationship among the actual-measuring points a1 to a6, as described. Hence it is possible to grasp changes in irregularity tendencies in the injection characteristics due to mass-production.

The predicting expression is made on multi-variable analysis by using the correcting amounts obtained at both the actual-measuring points a1 to a6 and the predicting points b1 to b6.

Figure 5:
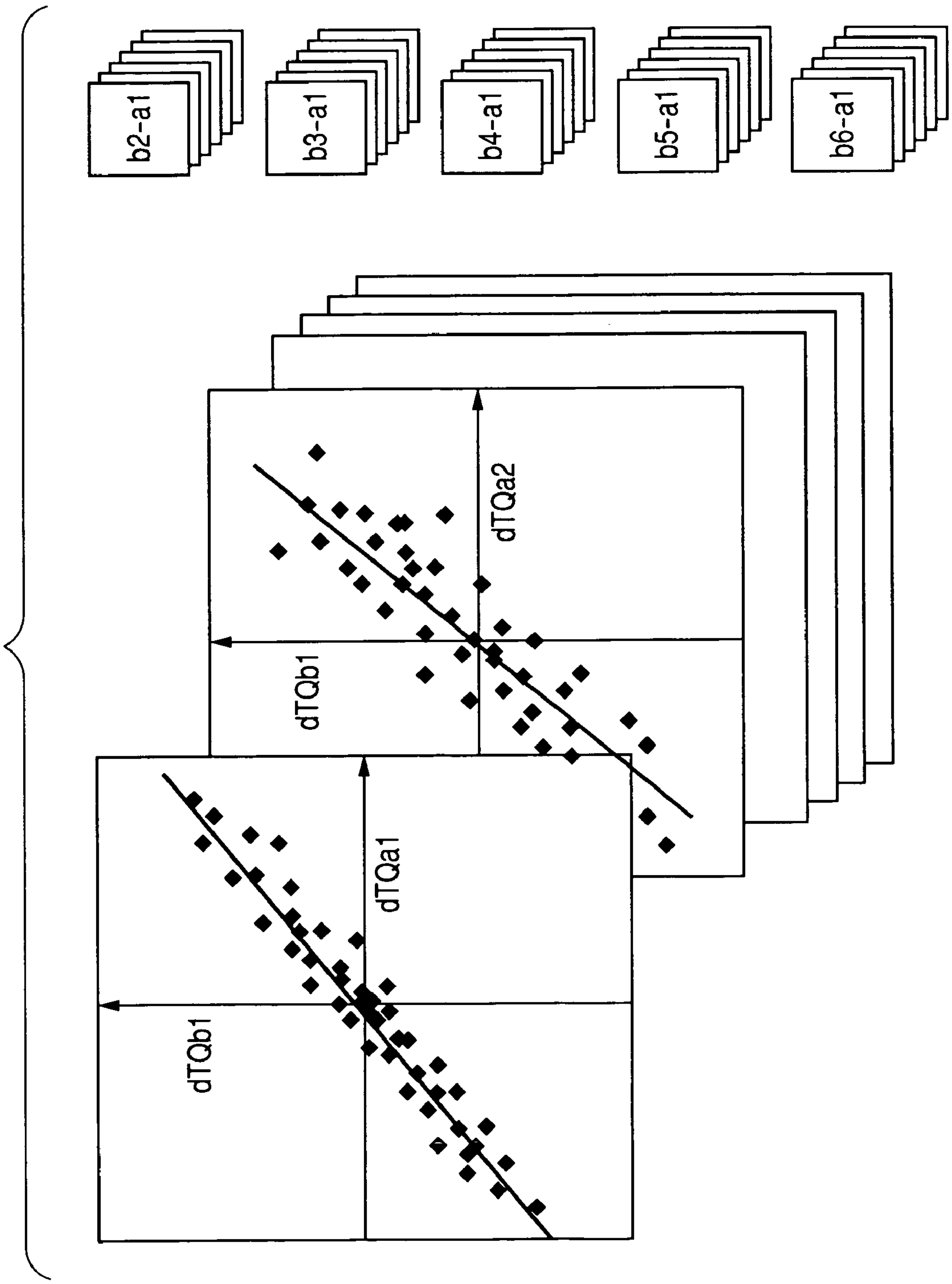
FIG. 5 is an illustration showing part of a process to produce a predicting expression that predicts correcting amounts at predicting points in the map on the basis of correcting amounts obtained at actual-measuring points in the map.

Now how to produce the predicting expression will be detailed. As shown in FIG. 5, as to each of correcting amounts dTQ at the respective predicting points b1 to b6, the relationship with each of the correcting amounts dTQ obtained at the actual-measuring points a1 to a6 is plotted. In FIG. 5, the example pictorially shows two sheets, as representatives, consisting of one sheet on which the correcting amounts dTQb1 at the predicting point b1 and the correcting amounts dTQa1 at the actual-measuring point a1 are plotted and the other sheet on which the correcting amounts dTQb1 at the predicting point b1 and the correcting amounts dTQa2 at the actual-measuring point a2 are plotted, and others. On each sheet, the relationship among the correcting amounts is pictorially depicted. As illustrated in FIG. 5, the number of such sheets totals to 36 (=6×6) pieces Then, as shown in FIG. 6A, as to each of the respective 36-pattern relationships among the correcting amounts on the 36 sheets, an explanation factor ($R^2$) between the correcting amount at each actual-measuring point and the correcting amount at each predicting point is calculated. Then, as shown in FIG. 6B, as to each of the correcting amounts at the respective predicting points b1 to b6, the respective correcting amounts at the actual-measuring points a1 to a6 are sequentially arranged in the descending order of largeness of the explanation factor ($R^2$). Then, explanation variables for a multiple regression expression of which objective variables are the correcting amounts of the respective predicting points b1 to b6 are given by selecting the three superior-positioned correcting amounts from the correcting amounts at the actual-measuring points a1 to a6 according to the largeness of their explanation factors. Hence the multiple regression expression, whose objective variables are correcting amounts of each predicting points b1 to b6, becomes a liner expression with three explanation variables.

For example, as exemplified in FIG. 6B, the regression expression (predicting expression) whose objective variable is the correcting amount dTQb1 at the predicting point b1 can be expressed by a liner expression that adopts the correcting amounts dTQa1 to dTQa3 at the actual-measuring points a1 to a3, respectively, which is as follows:

$$dTQb1=\alpha\times dTQa1+\beta\times dTQa2+\gamma\times dTQa3+\delta,$$

wherein δ is a constant term.

The constant term can be used for estimating the reliability of the predicting expression in producing thereof. That is, if there is no variability in the fuel injection characteristics, all the correcting amounts should be zero, whereby the constant term δ in the above expression is almost zero. Hence it is considered that, as the constant term δ becomes nearer to zero, the reliability of the predicting expression becomes higher. This means that the reliability of the predicting expression to be produced can be estimated by knowing how much the constant term δ is separated from zero.

Furthermore, a description will now be made concerning a relational expression defining the relationship among the actual-measuring points a1 to a6. In this case, similarly to the above case for producing the predicting expression, the multi-variable analysis is used which includes the following steps. (i): An explanation factor is calculated between the correcting amount at each of the actual-measuring points a1 to a6 and the correcting amounts at the remaining five actual-measuring points. (ii): As to each of the correcting amounts at the actual-measuring points a1 to a6, the three superior-positioned correcting amounts are selected from the correcting amounts having higher explanation factors connected with those at the actual-measuring points. (iii): A multiple regression expression is produced, wherein the correcting amounts at each of the actual-measuring points a1 to a6 are used as objective variables and the three correcting amounts at the selected actual-measuring points are used as explanation variables In this way, the predicting expressions and the relational expressions are produced. After this, the processing shown in FIG. 2 proceeds to step S16, where data indicative of the produced predicting and relational expressions are stored in the storage of the computer system placed in the manufacturing premise or in the memory device M of the ECU 50. The processing then proceeds to step S18, in which factory workers or robots are ordered by the ECU 50 or another computer system to start manufacturing the fuel injection valve 10 in large quantities for commercial use, or practical use. Then at step S20, each of the fuel injection valves 10 manufactured in a large scale for commercial use is subjected to measurement of injection characteristics at the actual-measuring points a1 to a6, and the resultant measurements are used to calculate, or measure correcting amounts.

After this calculation of the correcting amounts at the actual-measuring points, the processing is performed at step S22, wherein the predicting expression undergoes the estimation of the reliability thereof. In the present embodiment, the relational expressions with respect to the actual-measuring points a1 to a6 are used to calculate a shifted amount (i.e., difference) between each of the correcting amounts at the actual-measuring points a1 to a6, which are calculated at step S20, and each of the correcting amounts to be predicted on the relational expressions. Using these shifted amounts, the above predicting expressions are estimated in terms of their reliability.

Figure 7:
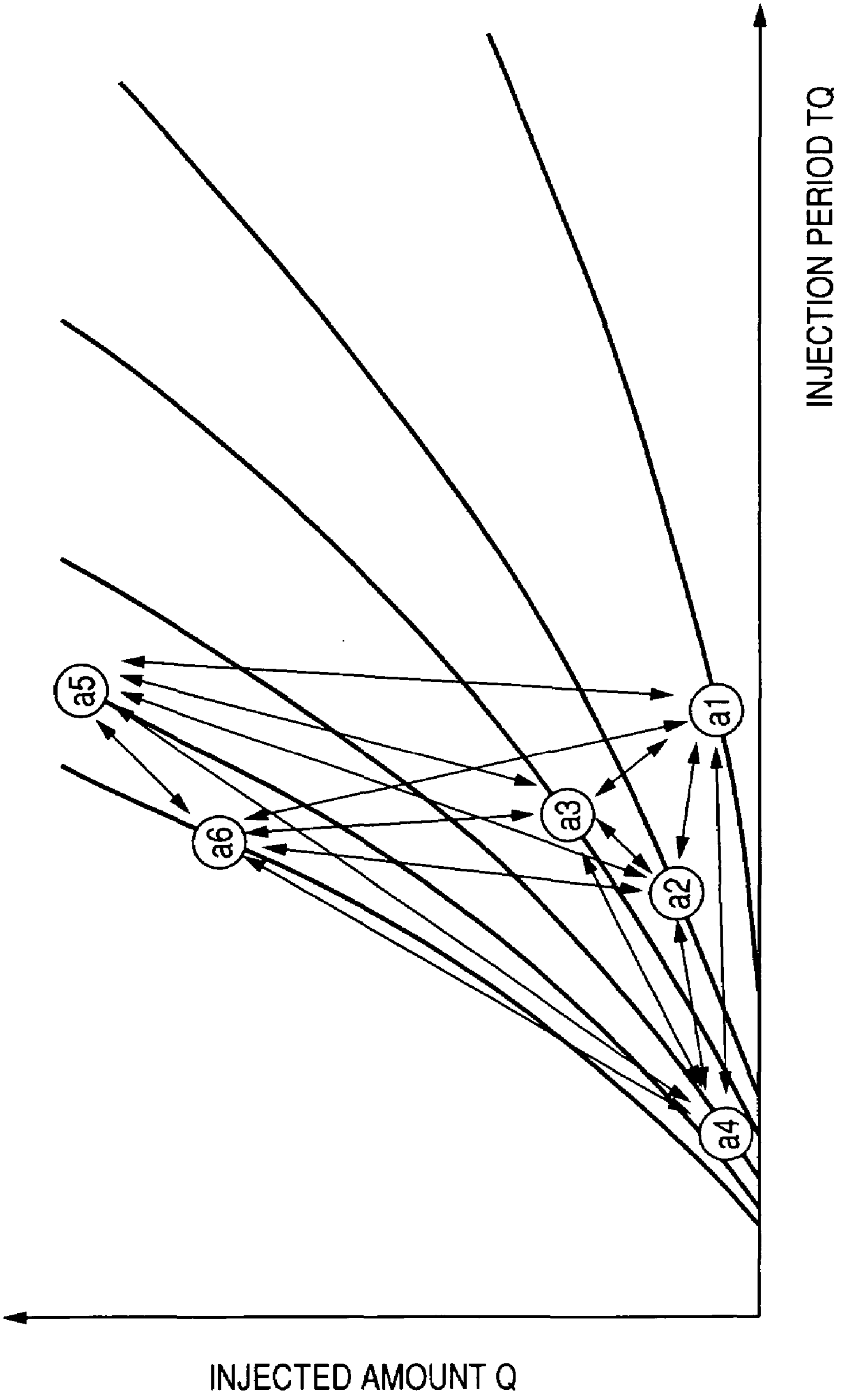
FIG. 7 is a graph pictorially showing how to estimate the reliability of the predicting expression.

Therefore, as illustrated in FIG. 7, using the above relational expressions, there is built a self-examination system in which each of the correcting amounts at the actual-measuring points a1 to a6 is examined based on the correcting amounts at the selected three actual-measuring points of the remaining actual-measuring points a1 to a6. In this system, the above rational expressions are derived from the trial-manufacturing described at step S10 in FIG. 2. As a result, changes in correlations among the current correcting amounts at the actual-measuring points a1 to a6 to correlations among the correcting amounts, obtained at the time of the trial-manufacturing, at the actual-measuring points a1 to a6 correspond to changes in the trend in manufacturing a large quantity of valves vs. in trial-manufacturing valves. Hence when the shifted amount is larger, the manufacturing trend changes to a degree, so that there is a fear that, even using the predicting expressions, the correcting amounts at the predicating points b1 to b6 may be predicted with poor accuracy.

In order to avoid such a fear, the predicting expressions are then subjected to estimation at step S22. Specifically, it is determined whether or not, as to the individual fuel injection valves 10 manufactured for commercial use, the actual-measuring points a1 to a6 include one or more actual-measuring points that show shifted amounts equal to or higher than a predetermined threshold. When it is determined affirmatively, that is, there are such actual-measuring points, the fuel injection valve 10 currently examined is counted as one that lowers the accuracy of the correcting amounts carried on the predicting expression. And when the appearance frequency of such count events occurring is over a predetermined limit, it is determined that the prediction of the correcting amounts based on the predicting expressions is not appropriate (i.e. reasonable level), and information indicating such an inappropriate prediction is fed back to the upstream steps (step S24, NO).

The threshold is set such that a decrease in the injection control precision, which is due to a decrease in the accuracy predicted by the predicting expression, is sufficiently higher than an allowed lowest accuracy for the injection control. The predetermined limit of the appearance frequency is set to a value that makes it almost zero a probability that the fuel injection valve 10, which is counted in response to a decrease in the prediction accuracy on the foregoing predicting expression, is mounted by a plurality of pieces of valves on a single diesel engine. For example, when the predetermined limit is set to "1/100," the probability that the above counted fuel injection valve 10 is mounted by a plurality of pieces of valves on a single 4-cylinder diesel engine is set to some "1/10000."

The foregoing feeding-back process is done in the manufacturing process (step S26; NO and step S28). In step S28, the relational expressions are used to know the manufacturing trend of the fuel injection valve 10.

For example, in cases where it is found that the shifted amount is often over the threshold at actual-measuring points located in a region having lower fuel pressures Pc (e.g., actual-measuring points a1 to a3), it is considered that there are larger manufacturing errors in the size of the needle seat 16 of the fuel injection valve 10 and/or the elastic force of the needle spring 22, which are shown in FIG. 1.

This will now be detailed. Open timing of the valve 10 at which the nozzle needle 14 comes off from the needle seat 16 is generated when, of the forces given by the fuel pressure applied to the nozzle needle 14, a valve-opening directional force overcomes a combined force consisting of a valve-closing directional force and the force of the needle spring 22. When the fuel pressure Pc is lower, it takes time to allow the valve-opening directional force given by the fuel pressure to overcome the elastic force of the needle spring 22 and other opposing forces, after the orifice 28 is freed by the valve element 26. This time interval is apt to be influenced largely by variability of the elastic force of the needle spring 22. Moreover when the fuel pressure Pc is lower, a period of time after which the nozzle needle 14 provides a maximum lift occupies a small portion of the injection period. Hence amounts of the injected fuel are apt to be influenced largely by variability of the size of the needle seat 16. Accordingly, in cases where the shifted amount is often over the threshold at actual-measuring points located in a region having lower fuel pressures Pc, it is estimated that the manufacturing trend changes to a situation where the size of the needle seat 16 and the elastic force of the needle spring 22 tend to have larger errors in their manufacturing.

In contrast, in cases where it is found that the shifted amount is often over the threshold at actual-measuring points located in a region having higher fuel pressures Pc (e.g., actual-measuring points a4 to a6), it is considered that there are larger manufacturing errors in the apertures of the orifices 19 and 28.

This will now be detailed. A period of time, which starts from the open of the orifice 28 by the valve element 26 to a case where a force applied in the valve-opening direction of the nozzle needle 14 by the fuel pressure overcomes a force applied in the valve-closing direction by the fuel pressure and the needle spring 22, depends on a decreasing speed of the force applied in the valve-closing direction. This force is against the force applied in the valve-opening direction. When the fuel pressure is higher, the decreasing speed is apt to be influenced largely by changes in the apertures of the orifices 19 and 28. Accordingly, in cases where the shifted amount is often over the threshold at actual-measuring points located in a region having higher fuel pressures Pc, it is estimated that the manufacturing trend changes to a situation where the apertures of the orifices 19 and 28 tend to have larger errors in their manufacturing.

Thus, when the manufacturing trend is estimated at step S28, the processing is shifted to step S18, where, based on the estimation that the manufacturing trend has been changed, the manufacturing process is checked. That is, an improvement will be done in the manufacturing such that a trend of variability of the injection characteristics of the fuel injection valves 10 to be manufactured in a large quantity is almost the same as those of the valves trial-manufactured (experimental manufacturing) at step S10. In the present embodiment, this improvement is done with reference to the manufacturing trend estimated at step S28. For example, in cases where the estimation at step S28 shows the manufacturing trend that larger errors are likely to be caused in the apertures of the orifices 19 and 28, the processes to produce the orifices 19 and 28 are checked whether or not there are any problems in those processes.

In this way, the manufacturing process is improved, and the processing at the foregoing steps S18 to S23 will be repeated. During the repeated processing, if the determination at step S24 still shows that that the predicting expressions are not appropriate, the processing is returned to step S12 to re-perform the processing starting from step S12. Namely, using the valves 10 which are now in mass-production, the correcting amounts at the actual-measuring points a1 to a6 and the predicting points b1 to b6 are measured again. Using data of the re-measured correcting amounts, the predicting expressions and the relational expressions are produced again to be memorized, as data indicative of those expressions, in the memory device M of the ECU 50 (i.e., the update of those expressions).

On the other hand, when it is determined at step 524 that the predicting expressions are appropriate (YES at step S24), the processing of the ECU 50 proceeds to step S30. At this step, the correcting amounts at the actual-measuring points a1 to a6 and the predicting expressions are used to estimate a correcting amount (or correcting value). Then the processing proceeds to sep S32, where the correcting amounts at the actual-measuring points a1 to a6 and the correcting amounts at the predicting points b1 to b6 are designated as correcting amounts (correcting values) to be used by this fuel injection control system. The data indicative of those designated correcting amounts are stored in the ECU 50.

Figure 8:
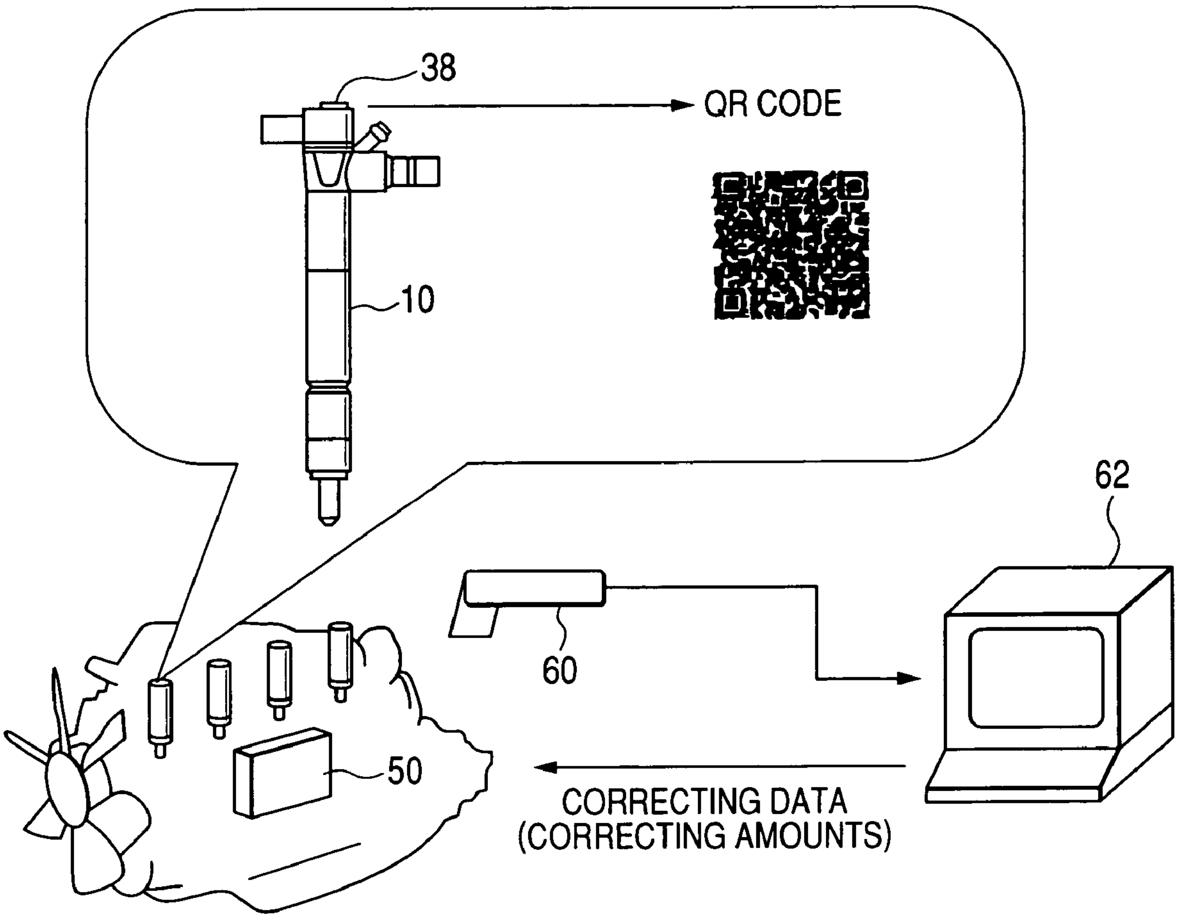
FIG. 8 is an illustration for an explanation of how to memorize data indicative of the correcting quantities into a memory device of an ECU provided in the system.

In the present embodiment, the storage of data of the correcting amounts which are produced at step S32 is carried out as follows. As illustrated in FIG. 8, the correcting amounts are memorized (embedded) as corresponding data in a QR code on the plate 38 installed on each fuel injection valve 10. For mounting each valve 10 onto a diesel engine, the QR code on the valve 10 is subjected to scanning by a scanner by a QR code scanner 60, and then temporarily taken into a personal computer 62 (or portable computer). The personal computer 62 converts the taken-in QR code to a data format that readably the ECU 50, and provides those converted data to the ECU 50. Hence the ECU is able to store the data of the correcting amounts and uses those data in controlling the fuel injection. That is, in the fuel injection control, the injection period of the fuel injection valve 10 is corrected (adjusted) depending on the correcting values.

In the present embodiment, as described, the injection characteristics of each of the fuel injection valves 10 to be manufactured in large quantities are measured at only the actual-measuring points a1 to a6, while the correcting amounts (correcting values) can still be acquired at both the actual-measuring points a1 to a6 and the predicting points b1 and b6. Further, if changes in the manufacturing trend are found, it is possible to improve the manufacturing process and/or update the predicting expressions, whereby the reliability of the corroding amounts can be kept high. This gives a higher reliability to the fuel injection control systems to be manufactured with the use of the respective fuel injection valves 10 to be manufactured for commercial use. In addition, it can be assured that a higher reliability is given to maintenance of the system after shipping it. For example, when it is necessary to replace the fuel injection valves 10 after several years have passed after the shipment, the possibility that the manufacturing trend has been changed compared to that in the manufacturing time during which the shipment was done is high. Even in such a case, information for suppressing or eliminating such changes in the manufacturing trend can be fed back to the manufacturing process. Moreover, if the feed backing measure is not sufficiently effective, the predicting expressions themselves are updated. Hence the correcting amounts of a fuel injection valve 10 newly provided through the maintenance are set to proper values predicted by the updated predicting expressions. This two-stage approach is therefore effective.

Therefore, the advantages obtained from the present embodiment can be summarized as follows.

At first, using the correcting amounts at the actual-measuring points a1 to a6 and the predicting expressions, the correcting amounts at the predicting points b1 to b6 are predicted (i.e., estimated). Thus, regardless of the fact that the fuel injection valves 10 to be manufactured for commercial use are subjected respectively to actual measurement at only the actual measuring points a1 to a6 for measuring variability of the injection characteristics, the correcting amounts can be obtained at both the actual-measuring points a1 to a6 and the predicting points b1 to b6. Thus man-hour cost for actually measuring the injection characteristics of the respective vales 10 can be decreased, while still adjusting, with precision, operation amounts of the manipulated variable to the valves.

Second, the relational expressions defining the correcting amounts at the actual-measuring points a1 to a6 is adopted. Hence, even when there arise changes in the manufacturing process of the fuel injection valves 10, the relational expressions can be used to know the changes. And, in this case, when the predicting expressions decrease in their reliability, information indicative of the decrease can be fed back to an upstream process, such as manufacturing process, thus suppressing or eliminating a decrease in the accuracy adjusting the injection performance of the fuel injection valves 10.

Third, it is determined that the reliability of the predicting expressions decreases, the foregoing feed-back to the manufacturing process precedes updating the predicting expressions. It is thus possible to suppress,variability in the hardware configurations as much as possible, whereby the reliability of the fuel injection valves 10 themselves can be kept high.

The forth advantage relates to improvement in the manufacturing process. Based on (i) the correcting values predicted (estimated) by using the multiple regression expression of which objective variables are the actual-measuring points a1 to a6 and (ii) as to the fuel injection valves 10 whose shifted amounts (differences) between the correcting amounts and the measurements are equal to or higher than the threshold, the determination that which ones of the actual-measuring points a1 to a6 provide shifted amounts higher than the threshold, the producing trend is estimated. With the aid of this estimated result, the manufacturing process can be improved.

The fifth advantage is to updating the predicting expressions when it is determined that the reliability of the predicting expressions decrease even after the improvement of the manufacturing process. This provides a two-stage countermeasure for keeping the predicting expressions so as to have high reliability.

The sixth advantage is as follows. In the embodiment, the event is detected in which shifted amounts between the correcting amounts at the actual-measuring points a1 to a6, which are estimated using the relational expressions, and the measured correcting amounts are equal to or higher than the threshold. And the frequency of appearances of such events are checked and subjected to the determination whether or not the frequency is above the limit. And it is judged that the reliability of the predicting expressions, which is necessary for the feed-back action, has decreased if it is determined that the frequency is above the limit. Thus, the threshold can be used to set an allowable range of variability of the injection characteristics of the individual fuel injection valves 10. The limit can be used to define an allowable range of the frequency of the above appearance events. Using the threshold together with the limit, the fuel injection can be controlled with precision.

The seventh advantage relates to the explanatory variables. In the present embodiment, the explanatory variables for the multiple regression expression for the prediction at the predicting points b1 to b6 are set to corroding amounts acquired at some (three in the embodiment) of the actual-measuring points, which provide higher explanatory percentages. This way makes it easier to produce the multiple regression expression and is useful avoiding the number of explanatory variables from increasing so many even when the actual-measuring points are increased in number.

The eighth advantage is derived from the selection of the adjustment points. In the embodiment, the actual-measuring points a1 to a6 and the predicting points b1 to b6 are set to the points that make it possible that those points have especially high priorities in deciding the performance of diesel engines and correcting amounts at the remaining points are calculated accurately by interpolation. By this technique, the correcting amounts can be calculated with precision over the entire operating region, with the correcting amounts at the top-priority points (points a1 to a6 and b1 to b6) still kept especially high.

(Other Embodiments and Modifications)

The foregoing embodiment can be developed into further modified configurations, which are still within the scope of the present invention.

The predicting expressions will not be limited to those described above. For example, the predicting expressions may be designated as multiple regression expressions that use, as their explanatory variables, all correcting amounts at all the actual-measuring points. Alternatively, a multiple regression expression whose explanatory variables provide higher explanatory percentages than a predetermined value may also be used. In this configuration, the reliability of the multiple regression expression is made higher.

Still alternatively, the predicting expressions are not limited to ones each having a liner function consisting of the corroding amounts at both the predicating and actual-measuring points. By way of example, as long as predicting accuracy may be higher by taking no-linearity, the predicting expressions can be made using non-linear functions.

The relational expressions are also not confined to the exemplified one. For instance, a multiple regression expression may be used, whose explanatory variables are correcting amounts at all actual-measuring points other than correcting amounts (serving as objective variables) at actual-measuring points. In addition, a multiple regression expression may be made to have explanatory variables composed of correcting amounts providing explanatory percentages (to objective variables) higher than a predetermined value. This is also helpful for giving a high reliability to the multiple regression expression.

Concerning the relational expressions, it is not limited to the configuration in which correcting amounts at arbitrary actual-measuring points are used to give a liner function for obtaining correcting amounts at the remaining actual-measuring points. Another example is to use a non-liner function as each relational expression, so long as the non-linearity should be taken into account for improving the prediction accuracy at the actual-measuring points.

The relational expressions, which define the relationship among the correcting amounts at the actual-measuring points, is not limited to a multiple regression expression that takes, as its objective variables, the correcting amounts at all the actual-measuring points a1 to a6. Alternatively the relational expressions may be composed of a multiple regression expression whose objective variable is a correcting amount at the actual-measuring point a1 residing in a region of a lower fuel pressure Pc and a further correcting amount at the actual-measuring point a6 residing in a region of a higher fuel pressure Pc. In this formula configuration, it is at least possible to discriminate whether a change in the manufacturing trend is originated from (i) an increase in errors of the size of the needle seat 16 and the elastic force of the needle spring 22 or (ii) an increase in errors of the apertures of the orifices 19 and 28.

The technique for defining the mutual relationship among the correcting a mounts at the actual-measuring points is not limited to the foregoing one, in which, as stated already, the relational expressions are used to predict (estimate or assume) correcting amounts at arbitrary actual-measuring points from correcting amounts at the other actual-measuring points. Alternatively, a function F defined by $$F(dTQa1,dTQa2,dTQa3,dTQa4,dTQa5,dTQa6)$$

may be used, in which the correcting amounts dTQa1 to dTQa6 acquired at all the actual-measuring points are used as variables and the function F applied to the respective trial-manufactured valves explained at step S10 in FIG. 2 gives values whose average is zero. If substituting the measurements of the correcting amounts into this function F creates a value which differs from zero on a large scale, it can be estimated that the reliability of the predicting expressions has decreased.

In the foregoing embodiment, until it is determined that the foregoing appearance frequency has exceeded the upper limit, the correcting amounts are predicted without rest based on the predicting expressions as to a fuel injection plug 10 and data of the resultant corroding amounts are stored in the ECU 50, even if a shifted amount of the fuel injection plug 10 exceeds the threshold. In this respect, an alternative way is that predicting the correcting amounts rests until a predetermined number of fuel injection valves 10 are manufactured and it is determined whether or not, as of the respective fuel injection valves 10 manufactured in large quantities, there are a predetermined number of valves whose shifted amounts are over the threshold. This way assures that the appearance frequency is measured more properly. In this case, fuel injection valves 10 whose shifted amounts are over the threshold can be disposed of without shipping as the products.

Modifications concerning the feed-back process are provided as well. It is preferred that the foregoing feed-back process is done toward the manufacturing process even if the appearance frequency have yet to reach the upper limit, in a case where a fuel injection valve 10 has a large shifted amount between the measurements of the correcting amounts at the actual-measuring points and the predicted amounts on the relational expressions.

When it is determined that the reliability of the predicting expressions has decreased, the information indicative of the decrease may be fed back to the manufacturing process, without updating the predicting expressions. Even in this case, the foregoing first, second, forth, sixth and seventh advantages can be enjoyed.

In addition, unlike the above, in response to the determination that the reliability of the predicting expressions has decreased, the predicting expressions may be updated, without feeding back the information to the manufacturing process. Even in this case, the foregoing first and second advantages can be enjoyed.

Concerning the variability of the fuel injection characteristics will not be limited to the variability of amounts of fuel to be injected, but variability of timing at which the injection starts may be adopted. In this case, the corroding amounts to compensate for the variability of the injection start timing are treated as correcting amounts for adjusting timing at which current is started to be supplied to the fuel injection valve 10.

As to how the adjustment points are designated, the technique illustrated in FIGS. 3 and 4 is just one example. An alternative way is possible for a fuel injection control system mounted in small engine-size cars, of which target users are for example housewives and senior people. In these cars, it can be estimated that the foregoing event appears most frequently when they are driven in cities. Thus, such driving conditions provide adjustment points to which top priority should be given.

The adjustment points will no be limited to the ones defined by the fuel pressure and the injection period. As noted in U.S. Pat. No. 6,520,423, an amount of injected fuel cannot be defined uniquely by the injection period and the fuel pressure, provided that the fuel injection valve is structured to have a nozzle needle whose lift amount (i.e., a manipulated variable) is adjustable continuously responsively to the displacement of an actuator. In this structure, the fuel injection valve requires an operated amount defined by, for example, an amount of energy given to the actuator and a duration during which the energy is given (i.e., injection period). Thus the amount of injected fuel is decided by the fuel pressure, the amount of energy, and the injection period. It is therefore preferred to define the adjustment points by using not only the operated amount based on the amount of energy and the injection period but also the fuel pressure.

For performing the actual fuel injection control, when taking into account the fact that the pressure in the combustion chamber depends on timing to start the fuel injection and thus depends on amounts of the injected fuel, the timing to start the fuel injection can be include in the parameters to define the actual-measuring points and the predicting points.

Moreover, the number of adjustment points may be arbitrarily selected.

In the manufacturing process according to the present embodiment, the step in which the fuel injection valves are manufactured in a trial basis is placed (step S10) and based on these valves, the predicting expressions are produced. But the predicting expressions may be produced on the mass-produced valves, not on the trial-produced valves.

The variations (irregularities) of the injection characteristics measured at the actual-measuring points and the predicting points are not limited to physical quantities quantified as the correcting amounts (correcting values). For example, a variation ΔQ itself obtained from the fuel injection amounts Q which serves as a reference may be adopted. In this modification, it is required to additionally calculate correcting amounts at the actual-measuring points and predicting points based on measurements of the variations ΔQ and predicted values thereof.

The fuel injection valves 10 are not confined as ones mounted to the diesel engine. For example, such valves can be mounted to cylinder-injection-of-fuel type of gasoline combustion engines. As the actuator arranged in the fuel injection valve 10, it is not limited to the electromagnetic actuator, but a piezoelectric actuator may be used.

Furthermore, although in the manufacturing process according to the embodiment, the data of the corroding amounts are memorized in the QR code on the plate 38 adhered to the fuel injection valve 38, this is not definitive list. Other two-dimensional codes other than the QR code may be used on the plate 38.

What is claimed is:

1. A calculation apparatus for manufacturing a fuel injection control system controlling an injection of fuel in an internal combustion engine with a fuel injection valve, comprising:

preparing means performing:

a first step wherein a plurality of measurement points are set in a map based on at least one of a pressure of the fuel supplied to the fuel injection valve and an injection period of the fuel in the fuel injection valve, the map being defined by an injection amount and the injection period in which the pressure is taken as a parameter, and one or more preparing fuel injection valves are subjected to measurement of variability in injection characteristics thereof at every adjustment point;

a second step wherein the plurality of adjustment points are classified into two groups consisting of one group composed by actual-measuring points and the other group composed by predicting points and, using the measured variability in the injection characteristics, a predicting expression predicting variability in the injection characteristics at the predicting points from variability in the injection characteristics at the actual-measuring points is produced and memorized;

a third step wherein, by using the measured variability in the injection characteristics, a first relationship among the variability in the injection characteristics at the actual-measuring points is defined and memorized;

measuring means for measuring variability in injection characteristics of each of manufactured fuel injection valves at the actual-measuring points; and adjusting means for adjusting a manipulated variable to each of the manufactured fuel injection valves by using measurements of the variability measured in the measured step, a second relationship among the measurements of the variability measured in the measured step, the first relationship among the variability in the injection characteristics memorized in the third step, and the predicting expression memorized in the second step.

2. A method for manufacturing a fuel injection control system controlling an injection of fuel in an internal combustion engine with a fuel injection valve, the method comprising steps of:

preparing for manufacturing including:

a first step wherein a plurality of measurement points are set in a map based on at least one of a pressure of the fuel supplied to the fuel injection valve and an injection period of the fuel in the fuel injection valve, the map being defined by an injection amount and the injection period in which the pressure is taken as a parameter, and one or more preparing fuel injection valves are subjected to measurement of variability in injection characteristics thereof at every adjustment point;

a second step wherein the plurality of adjustment points are classified into two groups consisting of one group composed by actual-measuring points and the other group composed by predicting points and, using the measured variability in the injection characteristics, a predicting expression predicting variability in the injection characteristics at the predicting points from variability in the injection characteristics at the actual-measuring points is produced and memorized;

a third step wherein, by using the measured variability in the injection characteristics, a first relationship among the variability in the injection characteristics at the actual-measuring points is defined and memorized;

measuring variability in injection characteristics of each of manufactured fuel injection valves at the actual-measuring points; and adjusting a manipulated variable to each of the manufactured fuel injection valves by using measurements of the variability measured in the measured step, a second relationship among the measurements of the variability measured in the measured step, the first relationship among the variability in the injection characteristics memorized in the third step, and the predicting expression memorized in the second step.

3. The method according to claim 2, wherein the adjusting step includes a fourth step wherein it is determined whether or not a shifted amount of the second relationship to the first relationship is equal to or higher than a predetermined value;

a fifth step wherein, in cases where it is determined that the shifted amount is less than the predetermined value, the measurements of the variability measured in the measuring step and the predicting expression are used to calculate a predicted value of variability of injection characteristics at the predicting points; and a sixth step wherein the manipulated variable to each of the fuel injection valves manufactured is adjusted based on both the measurements of the variability measured in the measurement step and the predicted value of the variability in the injection characteristics.

4. The method according to claim 3, further comprising a step of feeding back, in cases where it is determined that the shifted amount is equal to or higher than the predetermined value, information indicative of the determination is fed back to one or more upstream steps located before the fourth step.

5. The method according to claim 4, further comprising a step of manufacturing the fuel injection valves for practical use, the fuel injection valves being used as the fuel injection valves in the measuring step.

6. The method according to claim 5, wherein the feeding back step allows the information to be fed back to the manufacturing step.

7. The method according to claim 6, further comprising a step of further feeding back the information to the producing of predicting expression in the second step after feeding back to the information to the manufacturing process, in cases where it is determined that the shifted amount of the second relationship to the first relationship is equal to or higher than the predetermined value.

8. The method according to claim 6, wherein the first relationship is expressed by a relational expression that predicts the variability in the injection characteristics at arbitrary plural actual-measuring points of the actual-measuring points from other one or more actual-measuring points of the actual-measuring points, further comprising steps:

determining whether or not a shifted amount of the measurements to the variation of the injection characteristics predicted based on the relational expression is equal to or higher than a predetermined value;

estimating a manufacturing trend for the fuel injection valves produced in the manufacturing step on the basis of information showing which one or more points of the actual-measuring points provide the determination in the determining step that the shifted amount of the measurements is equal to or higher than the predetermined value; and feeding back information indicative of the determination to the manufacturing step in accordance with the estimated manufacturing trend.

9. The method according to claim 4, wherein the feeding back step allows the information to be fed back to the production of the predicting expression in the second step.

10. The method according to claim 9, comprising a step of allowing the first, second and third steps to be repeated in response to the fed-back information to the second step so that the predicting expression is updated.

11. The method according to claim 3, wherein the predetermined value is set to an upper limit regulating a frequency of appearance of events in which the shifted amount of each of the fuel injection valves produced in the manufacturing step is equal to or higher than a predetermined threshold.

12. The method according to claim 2, wherein the variation of the injection characteristics is quantified as a correcting amount for correcting a reference value to the manipulated variable.

13. The method according to claim 2, wherein the internal combustion engine is a diesel engine.

* * * * *